Lloyd R. Brown
INVENTOR.
BY Michael P. Breston
AGENT

Nov. 16, 1965 L. R. BROWN 3,218,610
FREQUENCY MODULATED SIGNALLING SYSTEM HAVING DETACHABLE
COMPONENTS FOR THE PHASE-LOCKED LOOP DETECTOR
Filed May 29, 1961 6 Sheets-Sheet 2

Lloyd R. Brown
INVENTOR.

BY Michael P. Breston

AGENT

Lloyd R. Brown
INVENTOR.

BY Michael P. Breston

AGENT

Lloyd R. Brown
INVENTOR.
BY Michael P. Breston
AGENT

Lloyd R. Brown
INVENTOR.

BY Michael P. Breston

AGENT

Nov. 16, 1965 L. R. BROWN 3,218,610

FREQUENCY MODULATED SIGNALLING SYSTEM HAVING DETACHABLE COMPONENTS FOR THE PHASE-LOCKED LOOP DETECTOR

Filed May 29, 1961 6 Sheets-Sheet 6

Lloyd R. Brown
INVENTOR.

BY Michael P. Breston

United States Patent Office 3,218,610
Patented Nov. 16, 1965

3,218,610

FREQUENCY MODULATED SIGNALLING SYSTEM HAVING DETACHABLE COMPONENTS FOR THE PHASE-LOCKED LOOP DETECTOR

Lloyd R. Brown, Sarasota, Fla., assignor to Electro-Mechanical Research, Inc., Sarasota, Fla., a corporation of Connecticut Filed May 29, 1961, Ser. No. 113,182
8 Claims. (Cl. 340—171)

This invention relates generally to telemetering systems, methods, and apparatus for demodulating frequency-modulated waves under optimum conditions.

The output, complex subcarrier signal of a telemetering receiver typically includes a plurality of distinct subcarrier signals, each carrying an intelligence signal whose instantaneous amplitude and frequency respectively correspond to the instantaneous magnitude of the frequency deviation $\Delta f$, from the subcarrier's "center" frequency $f_o$, and to the rate of change of $\Delta f$. When the subcarrier is assigned a maximum frequency deviation $(\Delta f)_{max}$ and a maximum rate of change $f_c$, the deviation ratio $D_r$ is commonly defined as the ratio between $(\Delta f)_{max}$ and $f_c$. Each subcarrier may be selected from the complex signal by a channel selector which includes a band-pass input filter (BPIF) whose bandwidth, equal to twice the maximum frequency deviation, is centered about $f_o$.

Each channel of a telemetering system is often required to transmit only a relatively narrow frequency band. Because of low-power, signal-generating transmitters, of interchannel crosstalk, of long radio links or transmission paths, etc., the received signal-to-noise ratios are relatively low. The noise associated with the signal takes the form of adjoining frequency components within the channel's pass-band.

To discriminate frequency-modulated subcarriers under noise conditions, it is advantageous to employ phase-locked loop (PLL) frequency detectors because of their potential capabilities, when properly utilized, to disassociate noise from intelligence. A PLL detector can be made to have a narrow loop bandwidth which is centered about the instantaneous frequency of the subcarrier signal; it can therefore be considered as a "tracking filter" whose bandwidth is relatively restricted compared to the bandwidth of the BPIF. Thus, the filtering action of the loop can be beneficially employed to strip the subcarrier signal of a substantial amount of noise. The final result is an improvement in the over-all signal-to-noise performance of the discriminator.

Unfortunately, because of inherent limitations existing in presently known PLL detectors, the loop bandwidth cannot be made as narrow as it might be desired without causing the loop to loose its ability to track the instantaneous subcarrier frequency. The "ideal" loop bandwidth need not be wider than the bandwidth of the transmitted intelligence signal. To illustrate numerically, in a typical standard subcarrier channel having a deviation ratio of five, the ideal loop bandwidth would need to be only one-fifth of the bandwidth of the BPIF. With such an ideal loop (assuming the noise to be equally distributed throughout the channel's pass-band), nearly eighty percent of the noise passing through the Channel Selector might be eliminated.

Since presently known phase-locked loop detectors do impose a minimum threshold value on the loop's bandwidth, it becomes of the essence, in order to fully exploit the inherent capabilities of the PLL detecter to act as a "tracking noise eliminator," to fit each loop of the telemetering system with an "optimum" bandwidth.

To assist in extracting the desired intelligence frequency band from the phase-locked loop detector, there is generally provided a Response Selector which includes a low-pass output filter (LPOF) having a cut-off frequency $f_c$ nearly equal to the highest frequency component in the desired frequency band.

For optimum discrimination (furnishing optimum noise suppression and minimum frequency distortion), the loop's bandwidth must be precisely fitted to the channel's frequency transmission characteristics, as specified by the bandwidth of the BPIF and the cut-off frequency of the LPOF.

In practice, it is highly desirable to be able to selectively provide a subcarrier discriminator with distinct Channel Selectors and Response Selectors. Since the optimum bandwidth of the loop depends on the frequency characteristics of the input and output filters, it follows that if filters having different frequency responses are consecutively coupled to the PLL detector, the loop will maintain a universal, optimum bandwidth only if some external adjustments are provided to reoptimize the loop's bandwidth every time that a distinct set of input and output filters is associated with the PLL detector.

If the loop's bandwidth is not reoptimized to suit each distinct set of input and output filters, the potential capabilities of the phase-locked loop detector are not maximally utilized. On the other hand, the reoptimization of the loop's bandwidth, if attempted, must follow a clearly defined method which is capable of being readily carried out by operators of telemetering systems.

After lengthy theoretical and experimental investigations, I have determined that by properly selecting the parameters of the components forming the phase-locked loop, and by judiciously associating those components which are instrumental in determining the optimum bandwidth of the loop with either the BPIF or the LPOF, depending upon the respective components' functions, a universal, optimum bandwidth can be automatically maintained for the PLL detector, without the need to adjust the components' parameters, when filters having distinct frequency responses are consecutively coupled to the detector.

Accordingly, it is an object of this invention to provide a method for receiving frequency-modulated signals under optimum conditions.

Another object of this invention is to provide new and improved systems for discriminating frequency-modulated signals, the discrimination being accomplished with minimum frequenecy distortion and optimum noise suppression.

Still another object of this invention is to provide new and improved phase-locked loop frequency discriminators readily adaptable to automatically detect, under optimum conditions, subcarrier signals, the deviation ratios of which are varied over a relatively wide range.

Yet another object of this invention is to provide new and improved telemetering systems for discriminating FM subcarriers existing in a plurality of channels in which either the Channel Selector and/or the Response Selector of any channel can be interchangeably inserted into any other channel to automatically establish therein optimum conditions for noise elimination.

A further object of this invention is to provide new and improved telemetering apparatus for processing frequency-modulated subcarriers which require a minimum of components, which are extremely versatile, and which can be operated by relatively unskilled personnel.

These and other objects of this invention are accomplished by making use of a clearly defined simple criterion for finding the loop's optimum bandwidth as a function of the channel deviation ratio and of the subcarrier center frequency, providing the loop with an optimized filter network, judiciously selecting the parameters of the components forming the optimized filter as a function of either the pass-band of the input band-pass filter or the cut-off frequency of the output low-pass filter, mounting those components whose parameters depend solely upon the cut-off frequency with the output filter and those components whose parameters depend solely upon the pass-band with the input filter, whereby optimum conditions for noise elimination are automatically established when the phase-locked loop detector is associated with distinct band-pass input filters and/or low-pass output filters.

In a preferred embodiment for carrying out the method of this invention, each BPIF is mounted together with the loop filter's components, the values of which depend upon the pass-band of the BPIF, on a common detachable support member, or Channel Selector; similarly, each LPOF is mounted together with the loop filter's components, the values of which depend upon the cut-off frequency of the LPOF, on another common detachable support member, or Response Selector; whereby, when the Channel Selector and the Response Selector are coupled to the remaining networks of the phase-locked loop discriminator, the discriminator will automatically contain an optimized loop for minimum frequency distortion and optimum noise elimination.

Additional objects and advantages of this invention will become apparent from the following detailed description when taken in conjunction with the accompanying drawings, in which:

FIG. 1 is a block diagram schematically illustrating a typical telemetering system employing phase-locked loop discriminators in accordance with this invention;

FIGS. *2a–2c* show input square waves, with varying phase relationships, applied to the phase-sensitive detector of FIG. 1 and the resulting output waveforms therefrom;

Figures 1, 3:
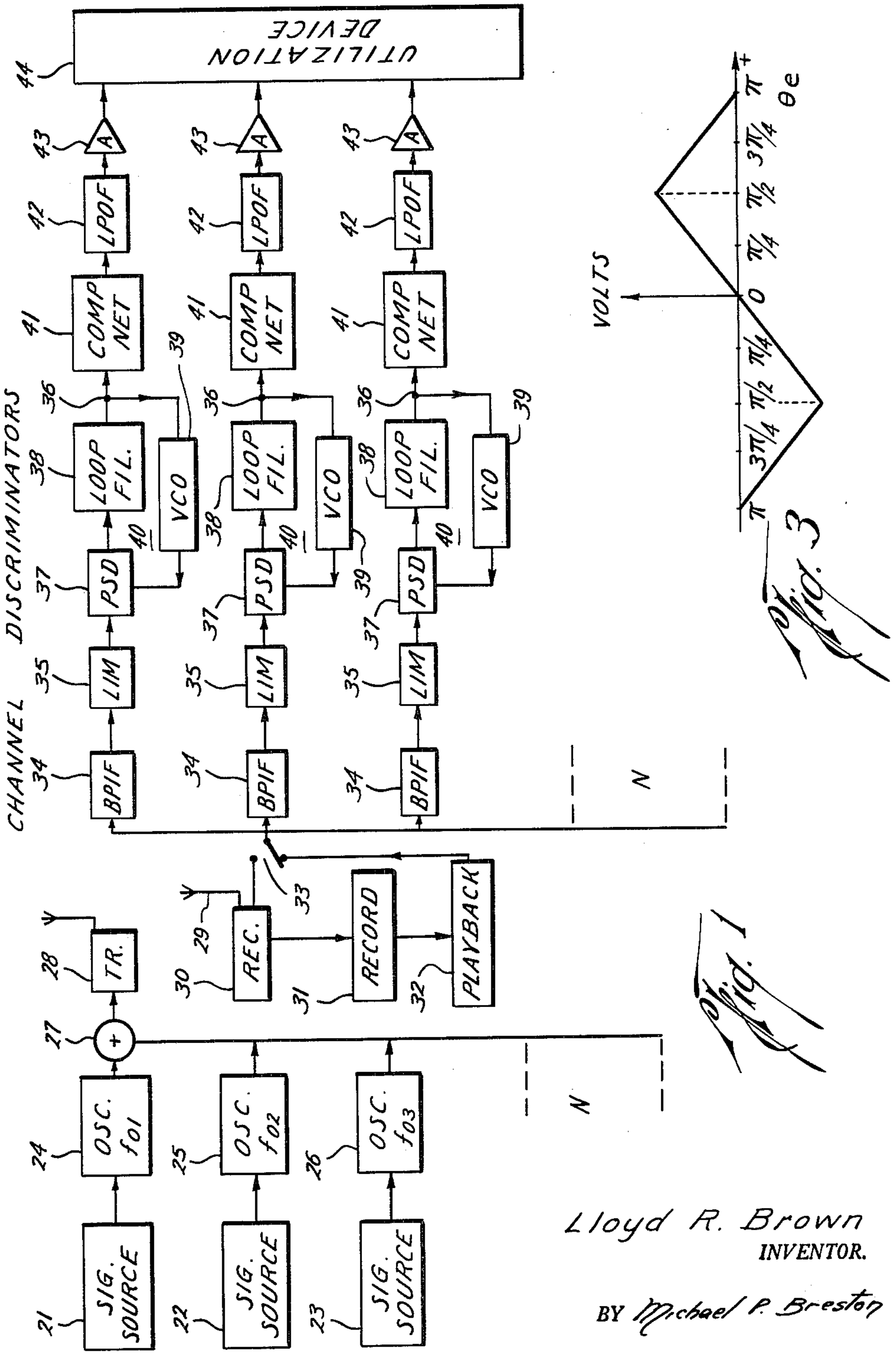
FIGS. 3 and 4 show graphs of the output D.C. component of the phase-sensitive detector, in volts, as a function of the input phase error to the phase-sensitive detector, in radians, when the applied signals are square waves and sine waves, respectively.
Figure 8:
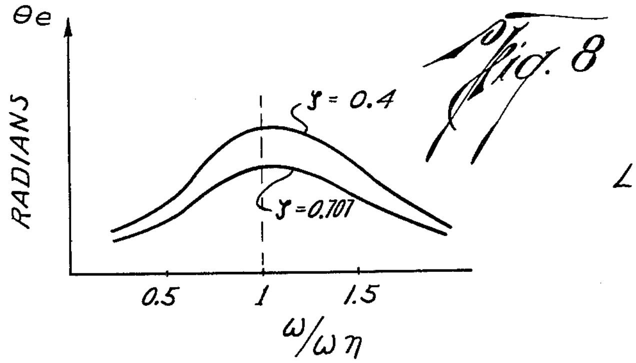
Figure 7:
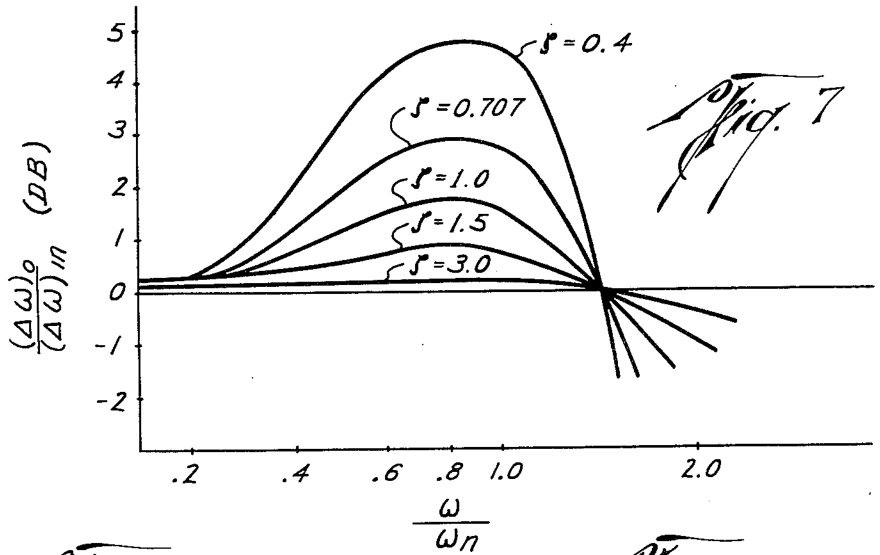
Figure 10:
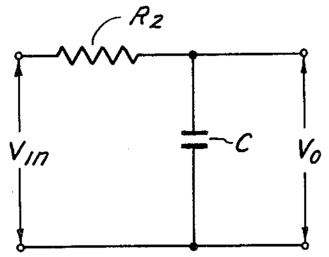
Figure 11:
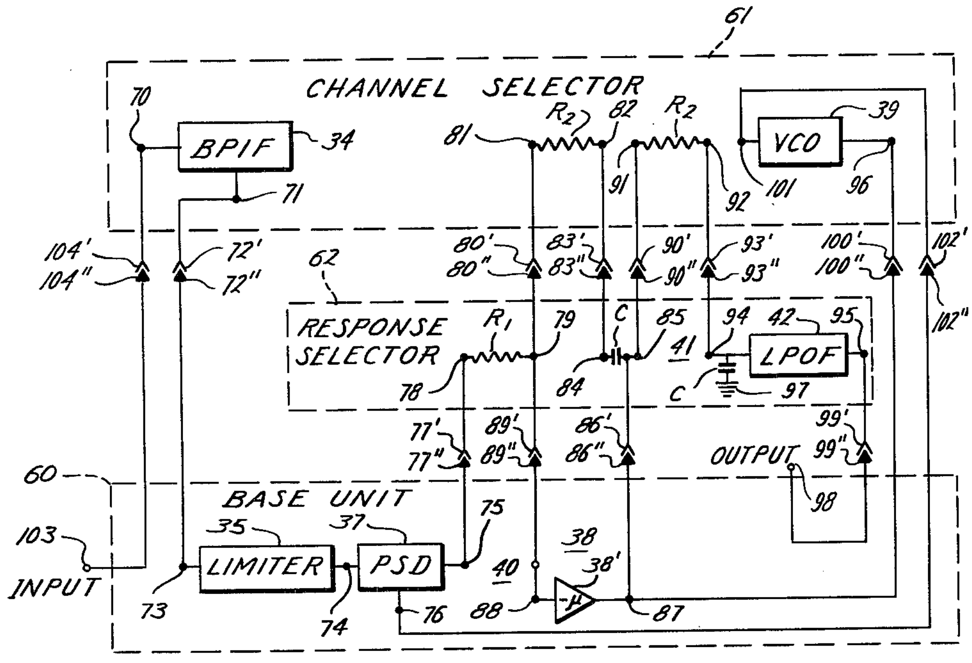
Figure 12:
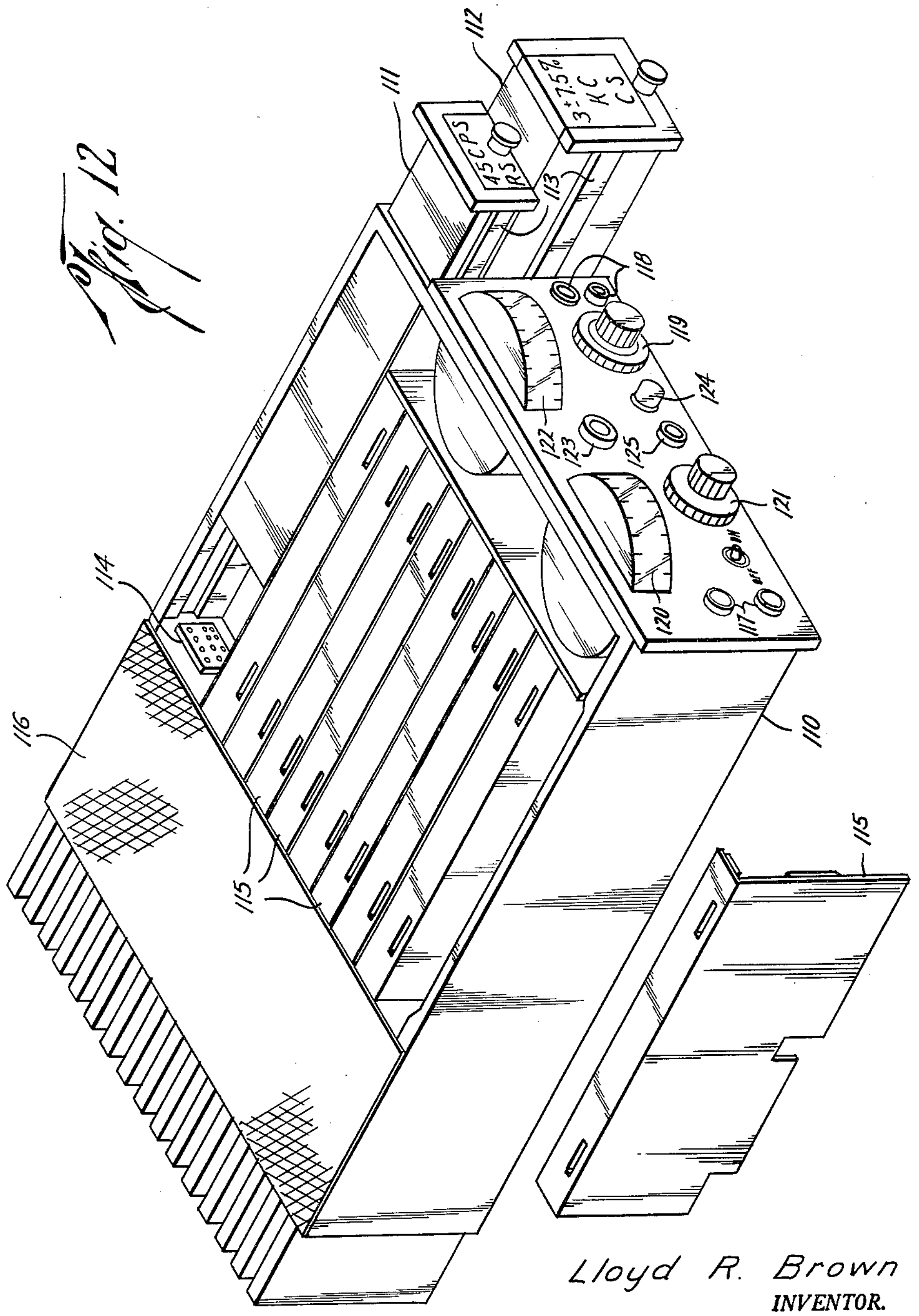

FIGS. 7 and 8 respectively show the detector's normalized frequency and phase error response curves for different damping ratios;

FIGS. *9a–9e* illustrate typical networks which may be employed as loop filters in the phase-locked loop detectors of FIG. 1;

FIG. 10 illustrates a simple network which may be used to compensate for the slight non-linearities introduced by the phase-locked loop detector;

FIG. 11 illustrates schematically how the Channel Selector may be cooperatively coupled to the Response Selector to form, together with the remainder networks of the detector, a universal phase-locked loop discriminator having a loop whose bandwidth is automatically preset to its optimum value; and FIG. 12 is a pictorial view of a discriminator featuring the detachable Channel and Response Selectors of FIG. 11.

There are several known telemetering systems classified in dependence upon the choice of modulation and multiplex methods employed. To avoid a wide diversity of approaches, the FM–FM system has been accepted as a standard telemetering system. It includes eighteen subcarrier frequencies selected to make the best use of the available frequency spectrum.

In Table I is given a partial list of the frequency characteristics of representative channels.

TABLE I

*IRIG subcarrier channels*

| Channel | Center Frequency (c.p.s.) | Lower Limit (c.p.s.) | Upper Limit (c.p.s.) | Frequency Response (c.p.s.) |
|---|---|---|---|---|
| 1 | 400 | 370 | 430 | 6 |
| 2 | 560 | 518 | 602 | 8 |
| 3 | 730 | 675 | 785 | 11 |
| * | * | * | * | * |
| 13 | 14,500 | 13,412 | 15,588 | 220 |
| 14 | 22,000 | 20,350 | 23,650 | 330 |
| * | * | * | * | * |
| 17 | 52,500 | 48,560 | 56,440 | 790 |
| 18 | 70,000 | 64,750 | 75,250 | 1,050 |

There is a ratio of approximately 1.3:1 between center frequencies of adjacent channels except between the 14.5 kc. and the 22 kc. channels where a gap is left to provide for a compensation tone if magnetic tape recording is used. The deviation is generally kept at ±7.5% for all channels with the option of a ±15% deviation on the five higher frequency channels 14–18 in order to provide for the transmission of higher frequency data.

It is usually specified that the standard receiving stations be capable of recording data at these specified maximum frequencies with less than ½% error. It should however be noted that the actual frequency response obtainable in any channel is dependent on many things, such as the actual deviation ratio used, the exact position in the band of the variable frequency, etc. Thus, it is desirable that the discriminator be so designed as to afford easy replacement of Channel Selectors and of any artificial means, such as Response Selectors having low-pass output filters, used to limit the frequency response of the channels. Deviation ratios as low as one may be used but signal-to-noise ratios as low as 20:1 and harmonic distortions as high as 10 to 20% should be expected, even under favorable operating conditions. For practical reasons, therefore, a deviation ratio greater than one, preferably five, is recommended. The values of the channels' frequency responses, given in Table I, correspond to a deviation ratio of five.

Referring now specifically to FIG. 1, there is shown a system for handling recorded information signals such as might be obtained in a standard FM–FM telemetry system wherein a carrier signal is frequency-modulated by a plurality of frequency-modulated subcarriers. Signal sources 21–23 generate D.C. or A.C. information signals which respectively modulate the output frequencies of subcarrier oscillators 24–26 about their center values $f_{01}$–$f_{03}$. The frequency-modulated subcarriers from oscillators 24–26 are then linearly added by adder 27 to form an output, composite subcarrier signal. To simplify the drawing, only three channels are represented in FIG. 1. It will be understood that in practice N (say eighteen standard IRIG) channels may be simultaneously employed.

The composite subcarrier then modulates the frequency of a carrier wave transmitted by transmitter 28 via a radio or other transmission link; the thusly multiplexed carrier is intercepted by the receiver antenna 29. After demodulating the carrier, receiver 30 reproduces the composite subcarrier signal which may first be recorded on a suitable recording medium, such as magnetic tape, by recorder 31. The recorded composite subcarrier signal is subsequently reproduced by playback unit 32 whose output is supplied to N parallel-connected channel discriminators corresponding to the number of subcarrier signals. As diagrammatically indicated by the double-throw switch 33, the received composite subcarrier signal may be directly applied to the N discriminators without first being recorded.

Each discriminator includes a band-pass input filter (BPIF) 34 which serves to extract from the composite subcarrier signal the particular channel's frequency spectrum to be demodulated. Along with the intelligence, the BPIF also passes an appreciable amount of noise falling within its pass-band, thus giving rise to a substantial noise-to-signal ratio. BPIF 34 may be either active or passive and should preferably exhibit no threshold properties of its own; that is, it should possess a substantially smooth frequency response across its pass-band of interest and provide maximum rejection outside its band edges. Filters 34, suitably, may comprise a number of stagger tuned resonant inductor-capacitor combinations isolated from each other by cathode-follower amplifier stages.

The output signal of BPIF 34 may first be converted into a square wave of substantially constant amplitude by a limiter 35. The output of each limiter 35 is then applied to a phase-locked loop detector (PLLD), each detector including at least three fundamental networks: a phase-sensitive detector (PSD) or multiplier 37, a loop filter 38, and a voltage-controlled oscillator (VCO) 39, all cascaded around a loop 40.

The function of the PSD is to compare the phase of the output signal of the VCO relative to the phase of the received subcarrier signal appearing at the output of limiter 35 and to produce an average potential indicative of their phase difference. The most common signals applied to the two inputs of the phase-sensitive detector are sinusoids or square waves. Therefore, VCO 39 is, preferably, either a multivibrator or a sine wave generator depending on whether a limiter 35 is employed or not.

Figure 2A:
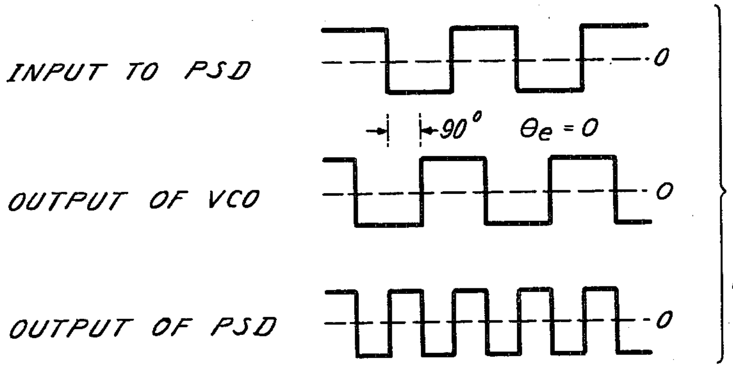
Figure 2B:
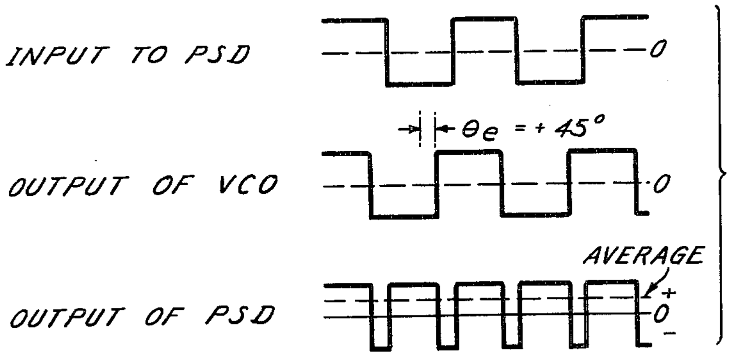
Figure 2C:
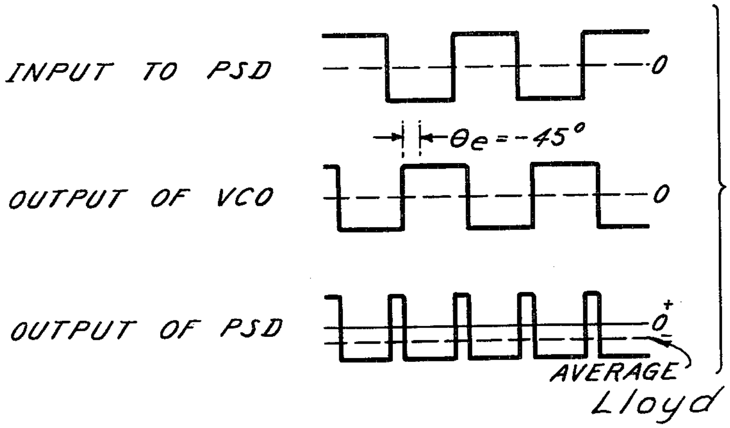

In FIGS. 2*a*–2*c* are shown typical input square waves to the PSD, shifted in phase by various amounts, and the corresponding output waveforms.

In FIG. 2*a*, the phase shift between the subcarrier input signal to the PSD and the output wave of the VCO is 90°. The PSD multiplies the two input square waves and furnishes their product which is also a square wave whose average or D.C. component is zero. The 90° phase shift is taken as the reference condition, corresponding to an "input" phase error $\theta_e=0$.

In FIG. 2*b*, the phase error $\theta_e$ between the two input square waves to the PSD is +45° (from the reference 90° phase shift), making the output product a rectangular wave in which the positive-going pulses have a longer time duration than the negative pulses. The output rectangular wave now has a positive D.C. component and a fundamental, double-frequency component.

Similarly in FIG. 2*c* the phase error $\theta_e$ between the two input square waves to the PSD is —45°, making the resultant product a rectangular wave now having a negative D.C. component and a fundamental, double-frequency ripple.

The shape of the output waveform from the PSD may be derived for any desired phase error $\theta_e$ by merely multiplying the two input waves to the PSD. In sum, if it is assumed that, due to the action of the phase-locked loop 40, the two input square waves to the phase-sensitive detector are of the same frequency, then the average output potential of the PSD is proportional to the input phase error $\theta_e$. Under static conditions, the phase error $\theta_e$ is substantially zero, corresponding to the condition shown in FIG. 2*a*. Under dynamic conditions, the instantaneous phase error fluctuates in response to frequency deviations (caused by intelligence, noise, crosstalk, etc.) from the center frequency of the subcarrier signal.

In FIG. 3 is shown a graph of the average output signal of the PSD as a function of the input dynamic phase error for the case when the two input signals to the PSD are square waves. When the phase shift between the square waves is 90°, corresponding to the reference condition $\theta_e=0$, the average output potential of the PSD is zero. When the phase error shifts from the reference position to approximately $\pm\pi/2$, the output average or D.C. component varies nearly linearly with the phase error. When the phase error reaches $\pm\pi/2$, the average output of the PSD attains a peak value and thereafter decreases with increasing phase errors. Hence, the linear operation of the phase-sensitive detector is limited to a range extending from minus $\pi/2$ to plus $\pi/2$. It is of the essence to note that it is this inherent limitation of the linear range of the PSD which renders the design of phase-locked loop detectors critical, and makes it necessary to seek an optimum loop bandwidth, whenever optimum noise elimination is desired.

Figure 4:
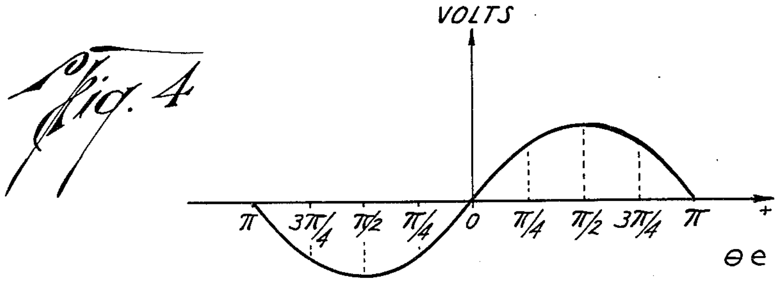

If the two input signals to the phase-sensitive detector are sine waves instead of square waves (i.e., if no limiter 35 is employed and VCO 39 is a sine wave generator instead of a multivibrator), then the average output signal of the phase-sensitive detector, as shown in FIG. 4, varies nearly sinusoidally as a function of $\theta_e$ since, as previously mentioned, the PSD performs the function of multiplication. By analogy to FIG. 3, the reference condition is again taken to be the case when the phase shift between the input sine waves to the PSD is 90°. As the dynamic phase error $\theta_e$ between the sine waves shifts from this reference or static condition, the average output potential of the PSD increases or decreases in dependence upon an increase or decrease in the phase error from the reference position. Again, the peak output of the PSD is attained when the phase error reaches $\pm\pi/2$. It will be appreciated that in the case of sine waves the nearly linear range of operation of the PSD is substantially reduced compared to the case of square waves. Therefore, in the subsequent exposition, it will be assumed that the inputs to the PSD are square waves.

In sum, in the absence of frequency modulations on the subcarrier signal, the average output potential of the PSD 37 is substantially zero. When, due to frequency deviations from the center frequency, the subcarrier signal begins to advance or retard in frequency, then the corresponding phase error (shifted 90°) is substantially instantaneously detected by the PSD to provide an output wave whose D.C. component has an amplitude and polarity related respectively to the magnitude and direction of the phase error. The output signal of the PSD is applied to the loop filter 38.

Essentially, the function of the loop filter 38 is to allow the average output of the PSD to pass therethrough while blocking as much as possible the double-frequency ripple illustrated in FIG. 2, thereby establishing the dynamic conditions, necessary for proper loop tracking. When the loop filter includes a D.C. amplifier, the D.C. component of the output of the PSD may even be greatly amplified while the A.C. ripple is substantially attenuated. Upon reaching the output of the loop filter at junction 36, the D.C. component, corresponding to an input phase error $\theta_e$ to the PSD, will modulate the frequency of the voltage-controlled oscillator 39 about its base value. The modulation will be such as to bring the frequency of the oscillator's signal to about the same frequency as that of the subcarrier signal, but shifted 90° in phase. In other words, the change in the oscillator's frequency is of such magnitude and direction as to seek to eliminate the phase error, $\theta_e$, originally responsible for the creation of the D.C. component at the output of the PSD 37.

For the average output potential, as measured at junction 36, to be proportional to the frequency deviation $\Delta f$ from the center frequency $f_o$ of the subcarrier signal, it is essential that the center frequency of the VCO be nearly equal to $f_o$ when the input signal to the VCO is zero, and that the frequency deviation of the VCO be proportional to the input voltage to the VCO. Hence, the linearity and stability of the phase-locked loop detector are primarily determined by the linearity and stability of the PSD and of the VCO.

The phase-locked loop detector is commonly called a "synchronous" detector because the output frequency of the VCO remains "locked" to the frequency of the subcarrier signal. Since the VCO translates substantially linearly and instantaneously the modulating voltage, applied to its input, into frequency deviations which are substantially equal to the frequency deviations $\Delta f$ about the center frequency of the subcarrier signal, it follows that the input signal to the VCO represents the transmitted intelligence signal. The intelligence signal could be taken directly from junction 36 but, preferably, and for reasons which will appear hereinafter, it is first applied to a compensating network 41 and then to a low-pass output filter (LPOF) 42. If necessary, the output signal of the LPOF may first be amplified by amplifier 43 and then supplied to a utilization device 44, such as a meter, recorder, etc.

The dynamic frequency response of the phase-locked loop detector to the frequency, $\omega$, of the transmitted data signal on the subcarrier is primarily determined by the time constants of the loop filter 38. If the PLLD were a linear system, these constants could be relatively easily determined from the desired frequency response for the loop. But due to the limited linear range of the PSD 37, as explained in conjunction with the description of FIGS. 3 and 4, the allowable practical optimum phase error produced by the intelligence signal renders critical the choice of the loop parameters. The phase error should not exceed an optimum value in order that the total phase error, engendered by intelligence, noise, interference, etc., should not exceed $\pm\pi/2$, else the PLLD would become, essentially, a non-linear device, producing severe frequency distortions in the finally demodulated version of the intelligence signal.

The main advantage which can be derived from the phase-locked loop detector, as compared to other types of FM detectors, is an improved signal-to-noise performance. However, the desired improved performance can only be obtained provided the loop's parameters, are properly selected. In fact, if the parameters are improperly chosen, the signal-to-noise performance of the PLLD, instead of being superior, may even become considerably worse than that of other types of detectors.

If the minimum dynamic frequency response of the loop could be made coextensive with the maximum frequency responses $f_c$ of the channel, the maximum amount of noise would be eliminated; but, then, the phase sensitive detector 37 would be required to operate near its non-linear region and, due to transients, noise, interference, etc., it could easily loose "lock," and, hence, its ability to temporarily detect the intelligence signal. For example, if the loop is operated near its non-linear region and the rate of change of $\Delta f$ entering the phase-sensitive detector is too high, making it very difficult for the loop to follow the frequency excursions on the subcarrier, then, the loop would get out of lock and lose synchronism. Thereafter, the loop will slip a cycle, or so, and again attempt to lock to the subcarrier on its next cycle. If the high-frequency signal does not disappear, synchronism in the PLLD cannot be restored. When the loop is out of lock, it loses its ability to act as a detector, thus engendering serious amplitude and frequency distortions in the demodulated intelligence data.

On the other hand, if the minimum dynamic frequency response of the loop were made nearly equal to the channel's maximum frequency deviation $(\Delta f)_{max}$, when the channel's deviation ratio is greater than one, then the loop would not readily loose lock but, instead, it would loose its inherent ability to act as a noise eliminator.

Between these two ranges, an optimum frequency response for the loop can be found which will provide a most satisfactory signal-to-noise performance.

As a result of extensive theoretical and experimental studies, I have determined that, for optimum noise rejection, the loop's bandwidth, $\omega_n$, should be related to the frequency characteristics of the channel by the following relation:

$$\omega_n=\alpha\sqrt{(\Delta\omega)_{max}\omega_c} \qquad (1)$$

where, $(\Delta f)_{max}$ is the maximum angular frequency deviation in rad/sec., typically $\pm 7.5\%$ from the channel's center frequency $\omega_o$, as specified in Table I, $\omega_c$ is the cut-off frequency of the LPOF, and $\alpha$ is a constant.

I have also found the value of $\alpha$ to be critical. This value depends upon the selected optimum input phase error $\theta_e$ to the PSD and upon the parameters of the loop. For example, if the optimum tolerable phase error $\theta_e$, engendered by the transmitted intelligence signal, is one radian, then $\alpha\doteq 1.0$, and, if the optimum $\theta_e=\pi/4$, then $\alpha\doteq 1.12$. As previously explained, $\theta_e$ should not exceed $\pi/2$; on the other hand, $\theta_e$ must not be too small, say much less than $\pi/6$, else the loop's bandwidth would become too wide and the PSD would be required to operate near its non-linear region.

Figure 5:
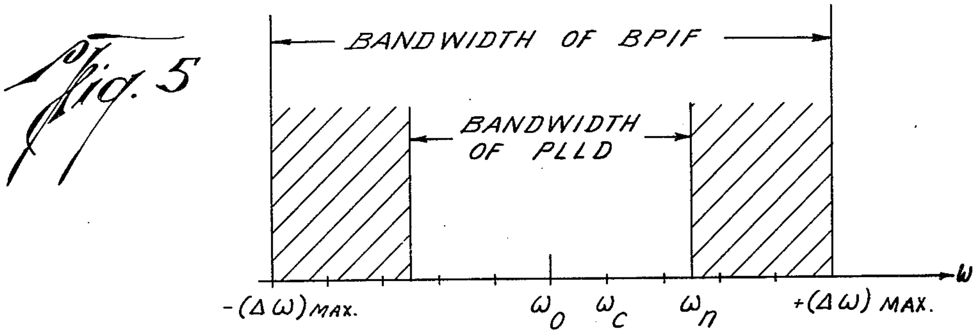
FIG. 5 is a schematic representation showing the respective positions of characteristic frequencies within the frequency spectrum of a typical subcarrier channel having a deviation ratio of five.

In FIG. 5 is shown a typical frequency spectrum for a channel with a deviation ratio of five and in which the optimum phase error $\theta_e=\pi/4$. The loop's bandwidth $\omega_n$ is then equal to one-half of $(\Delta\omega)_{max}$. The approximate amount of noise reduction achieved by the optimized loop, within the pass-band of the BPIF, is shown by the cross-hatched lines.

The significance and importance of Equation 1 will be more fully appreciated by relating the parameters of the loop to the channel's frequency characteristics.

Figure 6:
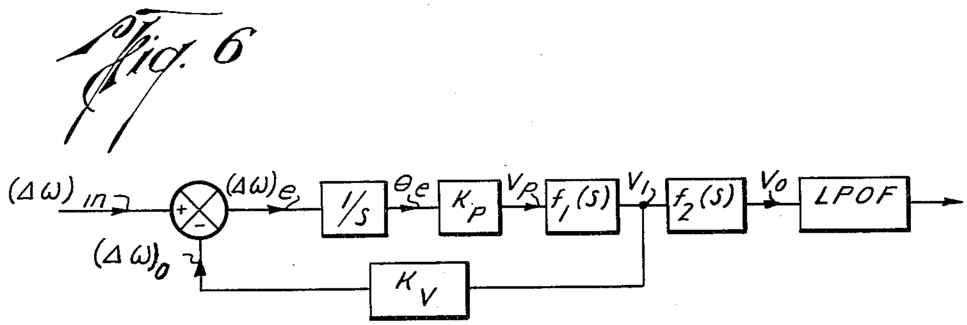
FIG. 6 is a functional linearized equivalent block diagram of the phase-locked loop detector shown in FIG. 1.

A functional block diagram of the phase-locked loop detector is shown in FIG. 6 where:

$\otimes$ =adder, subtractor, or multiplier;
$(\Delta\omega)_{in}$=deviation of the input angular frequency from the band's center frequency $\omega_o$, in rad/sec.;
$(\Delta\omega)_o$=deviation in the frequency of the VCO engendered by $(\Delta\omega)_{in}$, in rad/sec.;
$(\Delta\omega)_e=(\Delta\omega)_{in}-(\Delta\omega)_o$, in rad/sec.;
$s$=Laplacian operator;
$1/s$=integration, in $\frac{\text{rad}}{\text{rad/sec.}}$
$\theta_e$=phase error between the subcarrier signal and the signal of the VCO, shifted 90°, in radians;
$K_p$=PSD gain, in volts/rad;
$K_v$=VCO gain, in $\frac{\text{rad/sec.}}{\text{volt}}$
$K=K_pK_v$=total loop gain, in $\frac{\text{rad/sec.}}{\text{rad}}$
$V_p(s)$=output potential of the PSD, in volts;
$V_1(s)$=output potential of the loop, in volts;
$f_1(s)=V_1(s)/V_p(s)$=transfer function of the loop filter;
$V_o(s)$=input potential to LPOF, in volts; and
$f_2(s)=V_o(s)/V_1(s)$=transfer function of the compensating network.

For ease of analysis, it is assumed that $V_p$ is proportional to the phase error $\theta_e$, i.e., that the system is linear.

For optimum noise elimination, the loop filter should have a transfer function $f_1(s)$ which is approximately given by:

$$f_1(s)=\frac{T_2s+1}{T_1s+1} \qquad (2)$$

where $T_1$ is a lag-time constant and $T_2$ is a lead-time constant.

In practical circuits, $T_1 s >> 1$, hence, Equation 2 can be rewritten as:

$$f_1(s)=\frac{T_2 s+1}{T_1 s} \qquad (3)$$

The loop's transfer function is, by using Equation 3 for $f_1(s)$, $$\frac{V_1(s)}{(\Delta\omega)_{in}(s)}=\frac{K_p(T_2 s+1)}{T_1 s^2+KT_2 s+K} \qquad (4)$$

Therefore, to compensate for the expression in the numerator of Equation 4, the loop should be followed by a compensating network having a transfer function, $$f_2(s)=\frac{1}{T_1 s+1} \qquad (5)$$

It can be shown that, in FIG. 6, the phase error $\theta_e$ is given by:

$$\theta_e=\frac{s(\Delta\omega)_{in}}{s^2+2\zeta\omega_n s+\omega_n^2} \qquad (6)$$

where, $\omega_n$ and $\delta$ (zeta) are conventionally defined as, $$\omega_n=\sqrt{\frac{K}{T_1}}=\text{undamped resonant frequency of the loop, in rad/sec.} \qquad (7)$$

$$\xi=\frac{1+KT_2}{2\omega_n T_1}=\text{damping ratio of the loop} \qquad (8)$$

Since in practice $KT_2>>1$, Equation 8 can be rewritten as, $$\xi=\frac{KT_2}{2\omega_n T_1} \qquad (9)$$

Equation 6 may be normalized for sinusoidal subcarriers by letting, $$s=j\omega;\ \Omega=\frac{\omega}{\omega_c};\ \Omega_n=\frac{\omega_n}{\omega_c} \qquad (10)$$

and, $$D_r=\frac{(\Delta\omega)_{max.}}{\omega_c}=\text{deviation ratio} \qquad (11)$$

where;

$\omega$=angular rate of change of the frequency deviation $(\Delta\omega)_{in}$, in rad/sec.: thus, for sinusoidal data, $(\Delta\omega)_{in}(t)=(\Delta\omega)_{max}\sin\omega t$;

$\omega_c$=the angular cut-off frequency of the LPOF, in rad/sec.

Then, from Equations 6, 9, 10 and 11, $$\theta_e=\frac{j\Omega D_r}{[\Omega_n^2-\Omega^2]+j2\zeta\Omega_n\Omega} \qquad (12)$$

Let, $$\zeta=\frac{1}{\sqrt{2}}=\text{near optimum damping ratio for the loop} \qquad (13)$$

The absolute value of $\theta_e$ can now be written as, $$|\theta_e|=\frac{\Omega D_r}{\sqrt{\Omega^4+\Omega_n^4}} \qquad (14)$$

Since the PSD becomes a non-linear device when the total phase error engendered by intelligence, noise, etc., exceeds $\pi/2$, it is essential, for optimum demodulation, to select an optimum tolerable phase error, corresponding to the intelligence only, which is substantially less than $\pi/2$. Let, for example, the absolute value of $\theta_e$ optimum be one radian and assume further that the angular rate of change of the data signal, $\omega$, has a maximum value, i.e., $\omega=\omega_c$ or $\Omega=1$, then from Eqution 14, $$\Omega_n=\Omega\sqrt[4]{\frac{D_r^2}{\Omega^2}-1}\doteq\Omega\sqrt[4]{\frac{D_r^2}{\Omega^2}}$$

or, for $\Omega=1$, $$\Omega_n=\sqrt{D_r} \qquad (15)$$

Equation 15 can be rewritten by using Equation 10 and 11 as, $$\omega_n=\sqrt{\omega_c(\Delta\omega)_{max}} \qquad (16)$$

If it were decided that the desired absolute value of $\theta_e$ optimum be $\pi/4$, instead of one radian, then Equation 14, by using Equations 10 and 11, would yield, $$\Omega_n=\sqrt[4]{\frac{16}{\pi^2}-\frac{1}{D_r^2}}\sqrt{D_r}\cong 2.5\sqrt{\frac{D_r}{5}}=1.12\sqrt{D_r} \qquad (17)$$

or, $$\omega_n=1.12\sqrt{\omega_c(\Delta\omega)_{max.}} \qquad (18)$$

Similarly, for yet other values of $\theta$ optimum, slightly different constants would appear in the second half of Equation 18. It will be appreciated that Equation 18 is of the same form as Equation 1.

In the preferred embodiment of my invention, the optimum phase error for sinusoidal subcarriers was chosen as $\pi/4$ and, therefore, the constant $\alpha$ of Equation 1 was equal to 1.12. In the following description, however, Equation 16, instead of Equation 18, will be employed for ease of calculation; i.e., it will be assumed that $\alpha$ of Equation 1 is equal to unity.

In sum, the general Equation 1, as well as each of the specific equivalent Equations 16 and 18, establishes the functional relationship between the loop's optimum bandwidth $\omega_n$ and the channel's frequency characteristics, as determined by $(\Delta\omega)_{max}$ and $\omega_c$, in order that the optimum phase error (due to the intelligence portion of the transmitted signal) should not exceed a judiciously selected value when the intelligence frequency $\omega$ reaches the cut-off frequency $\omega_c$ of the LPOF, and that the damping ratio of the loop should have an optimum value. Best results were obtained with $|\theta_e|$ optimum$=\pi/4$ and $\xi=.707$.

FIGS. 7 and 8 show graphs from which the significance of the loop's bandwidth $\omega_n$ and damping ratio $\xi$ may be better appreciated.

In FIG. 7 is plotted the normalized frequency response $(\Delta\omega)_o/(\Delta\omega)_{in}$ of the PLLD versus $\omega/\omega_n$ for different values of $\xi$. The horizontal axis carries a logarithmic scale. It will be noted that for a deviation ratio of five $\omega/\omega_n=0.4$.

In FIG. 8 is plotted the phase error $\theta_e$ versus the normalized frequency $\omega/\omega_n$ for different values of $\xi$. As might be expected from the definition of $\omega_n$ as the undamped resonant frequency of the loop, the maximum phase error occurs when $\omega=\omega_n$. It will also be noted from FIGS. 7 and 8 that the value of $\xi$ determines the flatness of the normalized frequency response and the peak value of the phase error at resonance.

A wide variety of circuits can be found whose transfer functions could satisfy each of Equations 3 and 5. Moreover, the lead- and lag-time constants $T_2$ and $T_1$ could be those of resistance-inductance (R-L) networks, of resistance-capacitance (R-C) networks, or even of R-C-L networks. A few illustrative R-C networks are represented in FIGS. 9 and 10.

In FIGS. *9a–9e* are shown exemplary circuits whose transfer functions could be written in the form expressed by Equation 3. To illustrate, the transfer function $f_1(s)$ of FIG. 9*a* can be written as, $$f_1(s)=\frac{V_o(s)}{V_{in}(s)}=-\frac{R_2Cs+1}{(R_1+R_2)Cs+1}=\frac{T_2s+1}{T_1s+1} \quad (19)$$

where, $T_2=R_2C$ and $T_1=(R_1+R_2)C$.

Figure 9A:
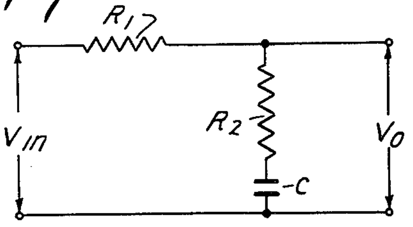
Figure 9B:
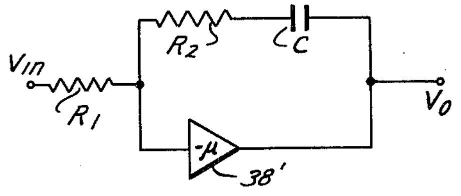

The transfer function $f_1(s)$ of FIG. 9*b*, which represents a high-gain operational amplifier, is the ratio of the feedback impedance to the input impedance hence, $$f_1(s)=\frac{V_o(s)}{V_{in}(s)}=-\frac{R_2Cs+1}{R_1Cs}=-\frac{T_2s+1}{T_1s} \quad (20)$$

where, $T_2=R_2C$ and $T_1=R_1C$.

Figure 9C:
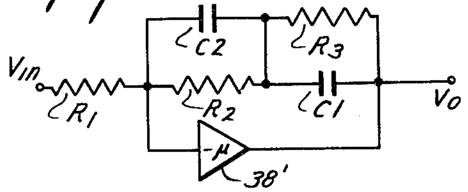
Figure 9D:
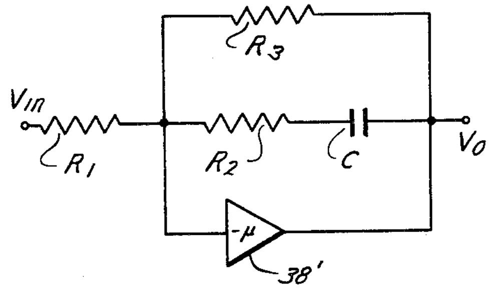

By analogy, the transfer functions of FIGS. 9*c* and 9*d* could similarly be derived.

Figure 9E:
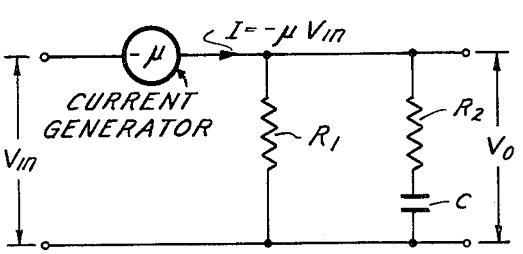

The transfer function of FIG. 9*e* is, $$f_1(s)=\frac{V_o(s)}{V_{in}(s)}=A\frac{RCs+1}{C}$$

where, $T_2=RC$ and $T_1=C$.

In FIG. 10 is illustrated a simple R-C compensating network whose transfer function $f_2(s)$ can be written in the form expressed by Equation 5 as, $$f_2(s)=\frac{V_o(s)}{V_{in}(s)}=\frac{1}{R_2Cs+1}=\frac{1}{T_1s+1} \quad (21)$$

where, $T_1=R_2C$. For convenience, $R_2$ and C of FIG. 10 have nearly the same numerical values as $R_2$ and C of FIG. 9*b*. Hence, the same criterion will determine the optimum parameters for both FIGS. 9*b* and 10.

One of the objects of this invention is to determine the optimum parameters for the loop filter's components and to mount these components in cooperative engagement with the BPIF and the LPOF in such a manner as to establish optimum conditions for demodulation of the intelligence signal by the PLLD regardless of the channel's frequency characteristics. To help in attaining these objects, equations will presently be derived relating the components' parameters to the channel's frequency characteristics.

The following mathematical analysis is given in an illustrative manner for the loop filter of FIG. 9*b* and its corresponding compensating network of FIG. 10. Equation 7 may be rewritten as, $$T_1=\frac{K_pK_v}{\omega_n^2} \quad (22)$$

or, by the use of the fundamental Equation 16, as, $$T_1=\frac{K_pK_v}{\omega_c(\Delta\omega)_{max.}} \quad (23)$$

If the gain of the VCO is selected so that a constant voltage V will always deviate the frequency of the VCO to the channel's band edge then, $$K_v=\frac{(\Delta\omega)_{max.}}{V} \quad (24)$$

Using $T_1=R_1C$ of Equation 20 and substituting Equation 24 into Equation 23 yields, $$T_1=R_1C=\frac{K_p}{V\omega_c} \quad (25)$$

Similarly, Equation 9 may be rewritten as, $$T_2=\frac{2\zeta\omega_nT_1}{K_pK_v} \quad (26)$$

Substituting Equation 23 for $T_1$, the fundamental Equation 16 for $\omega_n$, and multiplying and dividing by a constant A whose value should be in the order of $10^6$, yields $$T_2=R_2C=\frac{2\zeta A}{\sqrt{(\Delta\omega)_{max.}}\sqrt{\omega_c}}=\frac{2\zeta}{\omega_n} \quad (27)$$

Now, judiciously associating terms in Equation 27 and using the preferred value of $1/\sqrt{2}$ for $\zeta$ yields, $$R_2=\frac{A\zeta}{\sqrt{(\Delta\omega)_{max.}}}=\frac{A}{\sqrt{2}\sqrt{(\Delta\omega)_{max.}}} \quad (28)$$

and, $$C=\frac{2}{A\sqrt{\omega_c}} \quad (29)$$

substituting the value of C as given by Equation 29 into Equation 25 results in, $$R_1=\left(\frac{AK_p}{2V}\right)\left(\frac{1}{\sqrt{\omega_c}}\right) \quad (30)$$

Since A and V are made constants, if $K_p$ is suitably selected, for example, so as to have the same value in all the channels of the telemetering system, then $R_1$, $R_2$ and C will be uniquely predetermined as a function of each channel's frequency characteristics. Thus, if the PSD is driven by square waves, $K_p$, which represents the positive slope of the curve shown in FIG. 3, may be conveniently selected as, $$K_p=\frac{V_p}{\pi/2}=\frac{2V_p}{\pi} \quad (31)$$

where, $V_p$=peak amplitude of the square wave.

Inserting the value of $K_p$ from Equation 31 in Equation 30 yields, $$R_1=\left(\frac{AV_p}{\pi V}\right)\frac{1}{\sqrt{\omega_c}} \quad (32)$$

In sum, the parameters determining the time constants $T_1$ and $T_2$ of the optimized loop filter and of the compensating network, shown respectively in FIGS. 9*b* and 10, are:

$$R_1=\left(\frac{AV_p}{\pi V}\right)\frac{1}{\sqrt{\omega_c}} \quad (32)$$

$$R_2=\left(\frac{A}{\sqrt{2}}\right)\frac{2}{\sqrt{(\Delta\omega)_{max}}} \quad (28)$$

and, $$C=\left(\frac{2}{A}\right)\frac{1}{\sqrt{\omega_c}} \quad (29)$$

provided that the optimum damping ratio $\zeta=0.707$ and that the optimum phase error $\theta_e=1$ radian.

It will be noted that the values in the parentheses of Equations 28, 29, and 32 are constants of the system and that, therefore, $R_1$, $R_2$, and C, defining the time constants $T_1$ and $T_2$ of the loop filter, are uniquely determined by either $(\Delta\omega)_{max}$ or $\omega_c$. For slightly different optimum values of $\theta_e$ and $\zeta$, these constants should be modified correspondingly.

As previously mentioned, one of the primary objects of this invention is to provide a universal optimized phase-locked loop subcarrier discriminator, capable of discriminating all IRIG subcarrier bands, in which plug-in Channel Selectors and Response Selectors automatically establish the desired channel's bandwidth and maximum frequency response and, also, the optimum bandwidth for the loop of the PLLD.

To reach the desired goal, each of the optimized loop filter's components, such as $R_1$, $R_2$, and C, was made a function of only one frequency characteristic of the channel, i.e., either $(\Delta\omega)_{max}$ or $\omega_c$.

Then, the desired universal versatile subcarrier discriminator, in which conditions for noise elimination are automatically established for any subcarrier band of the telemetering system, can be readily achieved as follows: all the discriminator's networks, whose frequency responses are substantially independent of either $(\Delta\omega)_{max}$ or $\omega_c$, are conveniently mounted on a single Base Unit; similarly, all the components and networks, having, respectively, values and frequency responses which are dependent upon the channel's bandwidth, are mounted on a detachable Channel Selector; finally, all the components and networks, having, respectively, values and frequency responses which are dependent upon the channel's cut-off frequency, are conveniently mounted on a detachable Response Selector. Preferably, all the Channel and Response Selectors should be physically and electrically interchangeable with the Base Unit, so that, when cooperatively engaged together, they will establish an optimized PLL discriminator, which is electrically connected to receive a composite subcarrier signal and to extract therefrom the desired single subcarrier signal in accordance with the bandwidth of the BPIF within the Channel Selector, and, which is set to optimally demodulate the single subcarrier and to provide a version of the transmitted intelligence signals, having frequency components which fall below the cut-off frequency of the LPOF within the Response Selector.

An illustrative embodiment, which incorporates the teachings set forth above, is shown in FIG. 11. Use is made of the optimized loop filter, shown in FIG. 9*b*, and of the frequency compensating network, shown in FIG. 10. The discriminator's networks and components, whose respective frequency responses and values are substantially independent of the channel's bandwidth and frequency response, are mounted on a main support member or Base Unit 60; they include the limiter 35 (if employed), the phase-sensitive detector 37, and the amplifier 38', forming part of the loop filter 38 (shown in FIG. 9*b*).

Similarly, the networks and components, whose respective frequency responses and values are dependent on the particular channel's bandwidth, are mounted on a detachable Channel Selector 61; they include the band-pass filter 34, the voltage controlled oscillator 39, resistor $R_2$ of the loop filter 38, and resistor $R_2$ of the compensating network 41 (shown in FIG. 10). The value of $R_2$ is determined by the bandwidth of the BPIF 34, as specified by Equation 28, hence, each distinct band-pass filter requires a distinct resistor $R_2$.

Finally, all the networks and elements, whose respective frequency responses and values are dependent on the cut-off frequency of the LPOF 42 are mounted on a detachable Response Selector 62; they include the LPOF 42, resistor $R_1$ and capacitor C of the loop filter 38, and capacitor C of the compensating network 41. As established by Equations 29 and 32, the values of $R_1$ and C are uniquely defined by the cut-off frequency $\omega_c$ of the LPOF 42, hence, each distinct LPOF requires a distinct resistor $R_1$ and capacitor C.

The various networks and elements may be illustratively interconnected as follows: output terminal 71 of the BPIF 34 is connected to a receptacle 72', arranged to receive a mating plug 72'' which is connected to the input terminal 73 of limiter 35. The output terminal 74 of limiter 35 is connected to the input of the phase-sensitive detector 37, whose output terminal 75 is connected to plug 77''. Receptacle 77' is connected to one terminal 78 of resistor $R_1$, serving as the input impedance to the loop filter 38. The other terminals 79 of resistor $R_1$ is connected to plug 80''. Receptacle 80' is connected to one terminal 81 of resistor $R_2$, forming part of the feedback impedance of amplifier 38' of the loop filter 38. The other terminal 82 of resistor $R_2$ is connected to receptacle 83'. Plug 83'' is connected to one terminal 84 of capacitor C also forming part of the feedback impedance of amplifier 38' and serving to block the flow of D.C. current between the input and output circuits of the amplifier 38'. The other terminal 85 of capacitor C is connected to a receptacle 86' and to a plug 90''. Receptacle 90' is connected to one terminal 91 of resistor $R_2$, forming part of the compensating network 41. The other terminal 92 of resistor $R_2$ is connected to a receptacle 93'. Plug 93'' is connected to one terminal 94 of capacitor C also forming part of the compensating network 41. The other terminal 97 of capacitor C may be grounded to the chassis of the Response Selector 62. Terminal 94 is connected to the input of the LPOF 42 having an output terminal 95 which is coupled to the discriminator's output terminal 98 via receptacle 99' and plug 99''. Plug 86'' is connected to junction 87. Junction 79 is connected to the input terminal 88 of amplifier 38' via receptacle 89' and plug 89''. The output terminal 96 of VCO 39 is connected to the second input terminal 76 of the PSD 37 via receptacle 100' and plug 100''. The input terminal 101 of VCO 39 is connected to junction 87 via receptacle 102' and plug 102''. Finally, the input terminal 70 of BPIF 34 is connected to the discriminator's input terminal 103 via receptacle 104' and plug 104''. It will be appreciated that the support members for the Channel and Response Selectors 61 and 62 can take on various forms, such as plug-in printed circuit boards to facilitate their interchangeability with the Base Unit 60.

To illustrate a typical operation of the assembled discriminator, as shown in FIG. 11, it will be assumed that it is desired to receive the third subcarrier frequency band having a deviation ratio of 5 and a percent deviation of ±7.5%, as specified in Table I. Thus, the BPIF 34 will have a center frequency of 730 c.p.s., a lower band edge of 675 c.p.s., and an upper band edge of 785 c.p.s. Similarly, the LPOF 42 will have a cut-off frequency of 11 c.p.s. The composite subcarrier, derived either directly from the receiver 30 or from the playback unit 32, is applied to the discriminator's input terminal 103 on the Base Unit 60. BPIF 34 extracts from the complex subcarrier signal the single desired subcarrier signal falling within its pass-band. The selected subcarrier signal will be limited by limiter 35 to provide a square wave of substantially constant amplitude to the input terminal 74 of the phase-sensitive detector 37. The PSD 37 compares the phase of the output signal of the voltage controlled oscillator 39, applied to terminal 76, with the phase of the arriving subcarrier at terminal 74. The average output potential of the phase sensitive detector 37, appearing at terminal 75, is substantially linearly related to the input phase error, shifted 90°. In addition to the average or D.C. output potential, appearing at output terminal 75, there also exists a double-frequency A.C. ripple, as explained in conjunction with FIG. 2. This D.C. component will be greatly amplified by the high-gain D.C. amplifier of loop filter 38, whereas the A.C. ripple will be substantially attenuated. Thus, the path taken by the D.C. component from output terminal 75 to junction 87 is via resistor $R_1$, terminal 79 and through the amplifier 38'. Any A.C. ripple passing through this path will be fed back from junction 87 via the feedback impedance between junctions 79 and 87, to be cancelled out with the existing A.C. ripple at junction 79.

The amplified D.C. component, applied to the input terminal 101 of VCO 39, will change the oscillating frequency of the VCO 39 in a direction to bring about the cancellation of the input phase error to the PSD 37. The signal appearing at terminal 101 represents a demodulated version of the transmitted intelligence signal. This demodulated version, before being applied to the discriminator's output terminal 98, is first passed through the compensating filter network 41, formed by resistor $R_2$ and capacitor C, in order to compensate for the slight nonlinearities introduced by the phase-locked loop 40. The low-pass output filter 42 receives the output signal of network 41, appearing at terminal 94, and substantially attenuates all frequency components which exceed its cut-off frequency of 11 c.p.s.

If the value of each of resistors $R_1$, $R_2$ and of capacitor C is predetermined as a function of either the 110 c.p.s. bandwidth of BPIF 34, or of the 11 c.p.s. cut-off frequency of the LPOF 42, as specified by Equations 28, 29 and 32, then, the loop bandwidth, $\omega_n$, will automatically achieve its optimum value and, consequently, the phase-locked loop detector will automatically afford optimum noise elimination.

Now, if it were desired to receive the same subcarrier signal but with a different LPOF of, say 20 c.p.s., then a Response Selector 62 carrying such a LPOF along with its corresponding resistor $R_1$ and capacitor C should be operatively engaged with the Base Unit 60 to automatically establish an optimized bandwidth for the phase-locked loop detector.

Similarly, if it were desired to receive the fifth subcarrier, as specified in Table I, then it would only be necessary to insert into the discriminator a Channel Selector 61 carrying a BPIF 34 which is centered about 1300 c.p.s., and a Response Selector 62 carrying a LPOF of 20 c.p.s. Again, the operative engagement of units 60–62 affords optimum conditions for demodulating the desired subcarrier signal and for eliminating the noise associated therewith.

To illustrate in somewhat greater detail how the values of $R_1$, $R_2$ and C were computed for a discriminator built in accordance with the teachings set forth in this specification, the following exemplary equations are given:

$$R_1=\frac{3,370,000}{\sqrt{f_o}}\text{ ohms} \tag{33}$$

$$R_2=\frac{10,380,000}{\sqrt{(\Delta f)_{\max.}}}\text{ ohms} \tag{34}$$

and $$C=\frac{19,400}{\sqrt{f_o}}\text{ micromicrofarads} \tag{35}$$

where, $f_c=\omega_c/2\pi$ c.p.s., and
$(\Delta f)_{\max}=(\Delta\omega)_{\max}/2\pi$ c.p.s.

The selected constants for Equations 24 and 31 were:

$V$=40 volts, and
$K_p$=20.6 volts/radian (which made $V_p$=32.4 volts).

Illustratively, let us now find the exact values for $R_1$, $R_2$, and C for the eighth standard IRIG channel which requires a 3 kc. ±7½% Channel Selector and a 45 c.p.s Response Selector, making the deviation ratio $D_r=5$.

Equations 33–35 yield, $$R_1=\frac{3,370,000}{\sqrt{45}}=503,000\text{ ohms} \tag{36}$$

$$R_2=\frac{10,380,000}{\sqrt{225}}=692,000\text{ ohms} \tag{37}$$

and $$C=\frac{19,400}{\sqrt{45}}=2,890\mu\mu f \tag{38}$$

Finally, let us show that the thus computed values for $R_1$, $R_2$, and C will afford an optimum bandwidth $\omega_n$ and an optimum damping ratio $\zeta$ for the loop of the PLL detector. From Equation 24 one obtains, $$K_v=\frac{(\Delta\omega)_{\max.}}{V}=\frac{2\pi(\Delta f)_{\max.}}{V}$$

$$K_v=\frac{(6.28)(225)}{40}=34.8\frac{\text{rad./sec.}}{\text{volt}} \tag{39}$$

and substituting Equation 39 for $K_v$ in Equation 7 yields, $$\omega_n=\sqrt{\frac{K}{T_1}}=\sqrt{\frac{K_pK_v}{R_1C}}=\sqrt{\frac{(20.6)(35.8)}{(.503)(.00289)}}=707\text{ rad./sec.} \tag{40}$$

or, $$f_n=\frac{\omega_n}{2\pi}=\frac{707}{6.28}=112.5\text{ c.p.s.} \tag{41}$$

The damping ratio $\zeta$, as defined by Equation 27, is, $$\zeta=\frac{\omega_nT_2}{2}=\frac{\omega_nR_2C}{2}$$

$$\zeta=\frac{(707)(.692)(.00289)}{2}=.707=\frac{1}{\sqrt{2}} \tag{42}$$

In order for Equations 33–35 to provide a universal discriminator with automatically established optimum conditions for discrimination of any channel's subcarrier signal, the values obtained for the loop's optimum bandwidth $f_n$ and for the optimum damping ratio $\zeta$, from their respective defining Equations 7 and 27, must be exactly the same as the values obtainable from the design Equations 13 and 18. From Equation 18, $$f_n=\frac{\omega_n}{2\pi}=\frac{1.12}{2\pi}\sqrt{\omega_c(\Delta\omega)_{\max.}}$$

$$f_n=\frac{1.12}{2\pi}=\sqrt{(2\pi)^2(45)(225)}=112.5\text{ c.p.s.} \tag{43}$$

And from Equation 13, $$\zeta=\frac{1}{\sqrt{2}} \tag{44}$$

Hence, the values derived from the defining equations are identical to those obtained from the design equations. Therefore, the 3 kc. ±7½% Channel Selector carrying resistors $R_2$ and the 45 c.p.s. Response Selector carrying resistor $R_1$ and capacitors $C_1$, when both selectors are cooperatively engaged with the Base Unit, will automatically establish the necessary optimum conditions for discriminating the selected intelligence carrying subcarrier signal.

To gain a greater perspective of the versatility and ease of operation of the apparatus constructed in accordance with my invention, there is shown in FIG. 12 a pictorial view of a universal subcarrier discriminator incorporating the interchangeable Selectors of FIG. 11.

In FIG. 12, the universal subcarrier discriminator includes a main Base Unit 110, a Response Selector 111, and a Channel Selector 112. The Selectors 111, 112 are slidably disengageable from the Base Unit with the aid of guiding rails 113. When the selectors are fully inserted into the Base Unit, electrical contact is established with the remaining networks of the discriminator via multiple plug-in connectors such as 114.

For ease of maintenance and greater flexibility of application, most components are on plug-in printed circuit boards 115. The bulky power-supply components and the high-heat dissipation components are mounted in the rear section 116 especially designed for maximum cooling. The incoming composite subcarrier signal is applied to input jacks 117 adapted to receive a standard double-banana plug. The demodulated output intelligence data of the discriminator is conveniently made available at the output jacks 118. The output voltage is typically made single-ended and referenced to ground. The voltage goes positive for an increasing frequency deviation from the channel's mean frequency, and negative for a decreasing frequency deviation. The calibrated potentiometer 119 varies the output voltage corresponding to the band-edge frequency so as to satisfy Equation 24. Meter 120 indicates the relative amplitude of the subcarrier signal at the output terminals of the band-pass input filter. The meter range switch 121 provides interchangeable ranges for meter 120. The percentage of band-edge meter 122 indicates the average position of the incoming subcarrier frequency within the pass-band of the channel as selected by the Channel Selector. The balance connector 123 affords a means for calibrating the meters 120, 122 (and other networks) by applying standard frequencies to input terminals 117. A neon lamp 124 provides a visual indication of the zero signal or loss of lock operation by the phase-sensitive detector. A connector 125 provides an outlet for monitoring the loss of lock operation. The voltage available at connector 125 is approximately proportional to the percentage of time during which the phase-locked loop detector has lost lock.

The detachably engaged selectors 111 and 112, each carrying some critically predetermined components for establishing the optimum bandwidth for the phase-locked loop, make it possible to employ the main base unit 110 for all IRIG or other standard channels with greatly varying deviation ratios. By merely inserting a different Channel Selector or Response Selector, or both, into the main Base Unit, there is automatically established the Channel's center frequency $f_0$, the channel's bandwidth ($\Delta f_{max}$, the optimum loop's bandwidth $f_n$, the cut-off frequency $f_c$ of the low-pass output filter, and the frequency response of the compensating network. The insertion of the Selectors 111 and 112 automatically provides a universal subcarrier discriminator capable of optimally demodulating the selected subcarrier signal and of providing improved signal-to-noise performance.

Although the telemetering system was described with reference to a particular standard FM–FM transmission scheme to telemeter sinusoidal or analog data, the system is equally applicable to discriminate data in digital form, such as PDM, PAM, etc. As will be readily understood by a man skilled in the art, the discriminator can find other uses than in telemetry, for example, in radio, television, radar, and other communication systems. In addition, the universal discriminator of the present invention may be provided with delay networks for use with telemetering systems wherein tape-speed compensation is desired and wherein a reference unmodulated signal is usually included with the intelligence subcarriers to form the composite subcarrier signal. Typically, in such a system, a reference discriminator is used to detect the tape-speed variations on the reference signal and one intelligence discriminator is used to demodulate each intelligence carrying signal; the reference discriminator's output is then applied to each intelligence discriminator to compensate for the tape-speed variations existing on the incoming intelligence subcarrier signal.

Therefore it will be evident that the described embodiments are susceptible to various modifications in form and design within the scope of the invention as defined in the appended claims.

What is claimed is:

1. An apparatus to selectively discriminate an incoming electric wave whose frequency fluctuates about a mean value within a predetermined bandwidth at a rate corresponding to the frequency of a transmitted intelligence signal comprising: a band-pass filter having a passband substantially the same as that of said bandwidth to extract said incoming wave from adjoining waves; a phase-locked loop detector to demodulate said wave, said detector including a frequency variable signal generator for producing a local electric wave, a phase-sensitive detector arranged to compare the phases of said incoming and local waves and to produce a resultant signal in correspondence with the variations of their relative phase about a mean angle, and a regulating network coupled between said detector and said generator to transform said resultant signal into a control signal for optimally synchronizing said local wave with said incoming wave and for establishing said mean angle; said regulating network including impedance components arranged in predetermined circuit relationships in accordance with a governing transfer function, at least one component thereof having a value which is prescribed only as a function of said bandwidth, and at least another component thereof having a value which is prescribed only as a function of said rate; a low-pass filter coupled to said phase-locked loop detector to additionally receive said control signal and to provide a substantially linear version of said transmitted intelligence signal, a first detachable support member to carry said band-pass filter and said one component, a second detachable support member to carry said low-pass filter and said another component; means coupling the output of said band-pass filter to the input of said detector, and means coupling said one component and said another component to establish said regulating network in accordance with said predetermined circuit relationships.

2. The apparatus of claim 1 wherein said signal generator is carried by said first support member.

3. The apparatus of claim 2 wherein said signal generator is a square-wave generator and the means for coupling the output of said band-pass filter includes a limiter for converting said incoming electric wave into a square wave, said loop having a substantially constant predetermined damping ratio for different values of both of said bandwidth and said rate, and said loop additionally having an undamped resonant frequency which is substantially linearly proportional to the square root of said bandwidth and to the square root of said rate.

4. In a multi-channel telemetering system for optimally processing a plurality of FM subcarrier signals, a channel selector mounted on a first detachable support member arranged to receive said plurality of signals and to filter out a selected subcarrier signal corresponding to its bandwidth; a phase-locked loop detector to demodulate said selected subcarrier signal, said phase-locked looped detector including a regulating network adapted to stabilize the frequency response of said loop, said network including resistive and reactive elements arranged in predetermined circuit relationships in accordance with a governing transfer function; a filter mounted on a second detachable support member arranged to receive the output signal of said detector and to filter out the transmitted intelligence signal corresponding to its pass-band; at least one element of said network being mounted on said first support member and having a value which is prescribed only as a function of said bandwidth; at least another element of said network being mounted on said second support member and having a value which is prescribed only as a function of said pass-band; means coupling the output signal of said channel selector to the input circuit of said detector, means coupling the output signal of said detector to the input circuit of said filter, and means coupling said one element and said another element to establish said regulating network in accordance with said predetermined circuit relationships.

5. The system of claim 4 wherein said detector further includes a frequency controlled signal generator which is mounted on said first support member and coupled to receive the output signal of said network.

6. The system set forth in claim 4 wherein said loop has a substantially constant damping ratio for different values of said bandwidth and said pass-band, the undamped resonant frequency of said loop has an optimum value which is substantially linearly proportional to the square root of the product obtained by multiplying said bandwidth with said pass-band, and said reactive elements are capacitors.

7. The system set forth in claim 6 wherein said network includes a high-gain operational amplifier arranged to amplify direct current and relatively low-frequency signals and to substantially attenuate relatively high-frequency signals.

8. The system set forth in claim 6 wherein the prescribed value for said one element is substantially inversely proportional to the square root of said bandwidth, and the prescribed value for said another element is substantially inversely proportional to the square root of said pass-band.

References Cited by the Examiner

UNITED STATES PATENTS

| | | | |
|---|---|---|---|
| 2,462,759 | 2/1949 | McCoy | 329—122 |
| 2,838,673 | 6/1958 | Fernsler et al. | 329—122 |
| 2,924,706 | 2/1960 | Sassler | 329—50 |
| 2,943,193 | 6/1960 | Webb | 329—50 |
| 3,008,125 | 11/1961 | Zadoff et al. | 178—66 X |
| 3,047,659 | 7/1962 | Costas | 178—88 |
| 3,059,188 | 10/1962 | Voelcker | 178—66 X |
| 3,062,913 | 11/1962 | Myrick | 178—88 X |
| 3,078,344 | 2/1963 | Crafts et al. | 178—66 X |
| 3,109,143 | 10/1963 | Gluth | 178—88 X |
| 3,124,751 | 3/1964 | Gery | 178—88 X |

ROBERT H. ROSE, *Primary Examiner.*